No. 811,554. PATENTED FEB. 6, 1906.
E. E. ENGLUND.
CORN PLANTER.
APPLICATION FILED SEPT. 13, 1905.

2 SHEETS—SHEET 1.

Witnesses:
G. V. Domarus
Ged D Perry

Inventor:
Ernst Emil Englund
Bond Adams, Pickard Hackim
Attys

No. 811,554.
PATENTED FEB. 6, 1906.
E. E. ENGLUND.
CORN PLANTER.
APPLICATION FILED SEPT. 13, 1905.
2 SHEETS—SHEET 2.
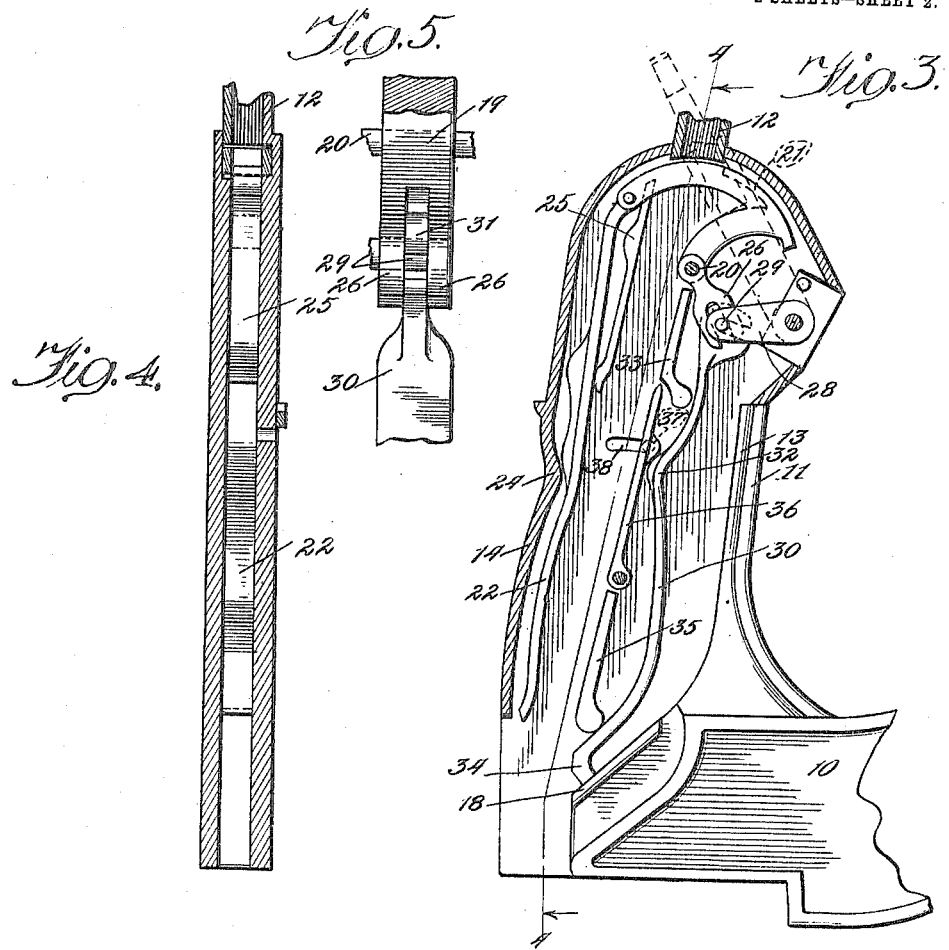
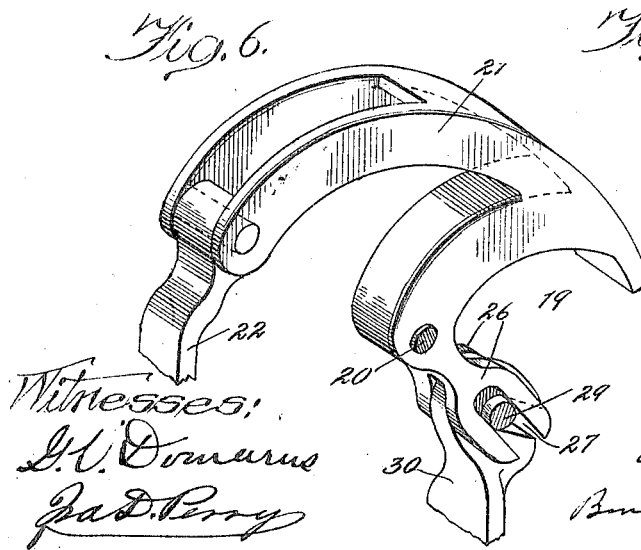
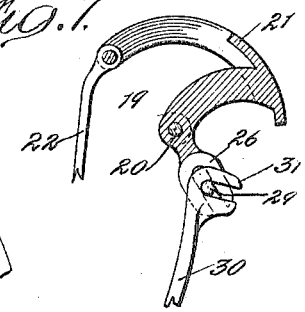

UNITED STATES PATENT OFFICE.

ERNST EMIL ENGLUND, OF MOLINE, ILLINOIS, ASSIGNOR TO D. M. SECHLER CARRIAGE COMPANY, OF MOLINE, ILLINOIS, A CORPORATION OF ILLINOIS.

CORN-PLANTER.

No. 811,554.

Specification of Letters Patent.

Patented Feb. 6, 1906.

Application filed September 13, 1905. Serial No. 278,284.

*To all whom it may concern:*

Be it known that I, ERNST EMIL ENGLUND, a citizen of the United States, residing at Moline, in the county of Rock Island and State of Illinois, have invented certain new and useful Improvements in Corn-Planters, of which the following is a specification, reference being had to the accompanying drawings.

My invention relates to corn-planters, and especially to that part of the seeding mechanism which is known as the "second drop" and which is adapted when used as a check-rowing device to deposit in the furrow the hills of corn which have been delivered to it ready for hilling by the seed-plates in the hopper.

The object of my invention is to provide a new and improved system of valves or second-drop mechanism which may be used both for depositing the corn in hills and for drilling in rows and which is so constructed and operated that when used in hilling or check-rowing the corn may be properly deposited in the ground and any liability to dribbling of the corn from the seed-delivering devices of the seedbox while the second-dropping mechanism is open be prevented.

It is a further object of my invention to improve the second-drop mechanism of corn-planters in sundry details, as hereinafter set forth.

Figure 1:
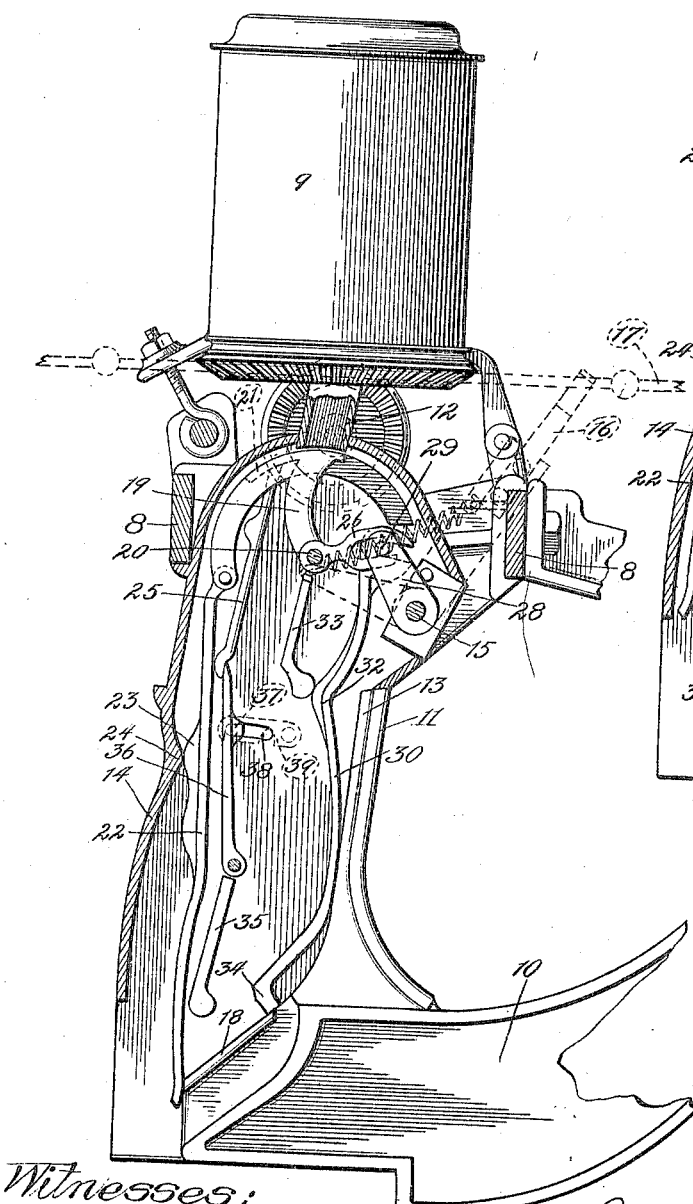
Figure 2:
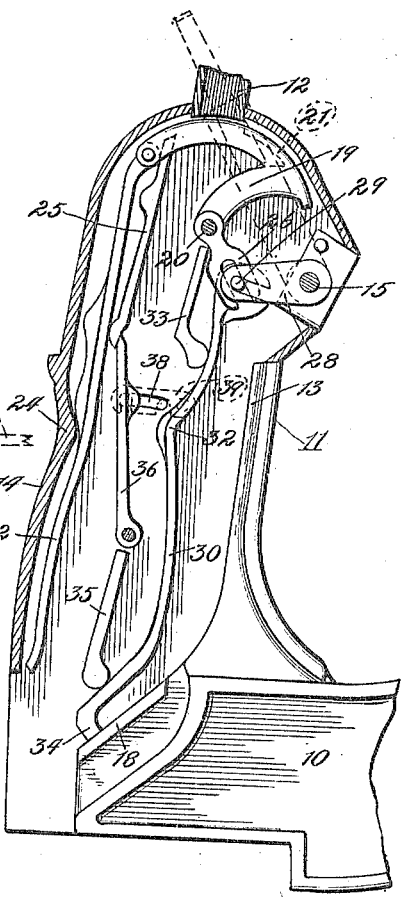

In the drawings, Figure 1 is a side elevation showing a portion of the runner or furrow-opener and conducting-tube or shank with one of its sides removed for the purpose of showing the operating mechanism. Fig. 2 is a view of a part of the runner or furrow-opener and conducting-tube or shank with the side removed, showing the dropping devices in their last position when the corn is being dropped. Fig. 3 is a view of a portion of the runner or furrow-opener and conducting-tube or shank, showing the mechanism arranged for drilling. Fig. 4 is a section on line 4 4 of Fig. 3. Fig. 5 is an enlarged detail, being a view of a portion of the rocking seed-valve in the tube. Fig. 6 is an enlarged detail, being an isometric view of the rocking seed-valve with a portion of the plunger-arm; and Fig. 7 is a detail, being a view of the rocking seed-valve in section and showing portions of the arms connected thereto.

Referring to the drawings, 8 indicates portions of the front or runner frame of the usual planter, upon which are mounted the usual seedbox 9 and runner or furrow-opener 10, having a shank or conducting-tube 11. The seedbox 9 is of any approved form and construction and contains the usual seeding devices, which are not shown, as they form in themselves no part of my present invention. As they are well understood, it is believed it is not necessary to show and describe them here. The shank 11 of the runner 10 is hollow and is provided at its top with a discharge-tube 12, through which the seed is delivered by means of the seeding devices in the hopper 9. The shank 11 has a front wall 13 and rear wall 14 and is open in the usual manner at the heel for the discharge of the corn.

15 indicates a rock-shaft which is operated by fork-levers 16 and knots on the tappet-wire 17. The fork-levers are shown as connected directly with the rock-shaft; but they may be of any well-known form and construction and operate the rock-shaft in any other well-known and approved manner.

The top of the runner-shank 11 is preferably curved in its interior surface, as shown.

18 indicates a sloping shelf which inclines backward and downward across the opening in the runner from side to side and toward the opening in its heel.

19 indicates a rocking valve which is pivoted upon a pivot 20 near the top of the runner-shank. Referring to Figs. 6 and 7, where this valve is shown in detail, the rocking valve 19 is provided with a curved valve-plate 21, the curve of which is on the arc of a circle whose center is the pivot 20, and which is so journaled as to move back and forth across and close to the lower end of the discharge-tube 12. The rearward end of this valve-plate is opened, as is best shown in Figs. 6 and 7, so as to provide a passage-way through which the seed may fall when the rocking valve is rocked forward. The closed portion of the valve-plate 21 closes the opening at the seed-tube 12 when the parts are in their normal position and receives upon it the grains of seed deposited by the seeding devices in the hopper.

22 indicates a plate which is pivotally connected at its upper end with the rearward arm of the rocking valve 19 and is provided near its center with a cam portion 23, which is adapted to bear against an inward-projecting cam portion 24 on the inside surface of the rear wall of the runner-shank 11.

25 indicates a rigid plate which extends across the upper portion of the runner-shank inside from side to side a short distance to the rear of the seed-tube 12 and between the lower end of which and the cam portion 24 the plate 22 moves.

The cam portions 23 and 24 are so shaped that when the rocking valve 19 is in its normal position (shown in Fig. 1)—that is to say, when the check-row forks are in their normal position before being acted upon by the knots on the tappet-wire—the lower end of the plate 22 will be held against the rear end of the shelf 18 and forms a closure therefor. The cam portion 23 is also so shaped that when the rocking valve 19 is rocked by the check-rowing devices into the position shown in Figs. 2 and 3 the plate 22 will be raised, moving between the cam portion 24 of the rear wall of the runner, and the lower end of the plate 22 will be thrown backward against the rear wall of the runner-shank, as shown in Figs. 2 and 3.

The rocking valve 19 is provided with a forward-projecting arm 26, which is forked into two portions, each one of which is slotted as at 27.

28 indicates an arm on the rock-shaft 15, through which passes a pin 29, which engages the slots in the forked arm 26. When the check-row fork is thrown backward by the operation of the knots on the tappet-wire, the arm 28 is rocked backward and downward and the valve-plate 21 of the rocking valve 19 is rocked forward, so as to bring its open portion underneath the discharge-spout 12, allowing any grains of corn that may have been delivered to it by the action of the seeding devices to fall down the interior of the runner-shank toward the sloping shelf 18.

30 indicates a plate which moves between the side walls of the runner-shank 11 and is provided at its upper end with a fork 31, which is adapted to lie between the two arms 26 of the rocking valve 19 with the fork engaging the pin 29 on the rock-arm 28. A short distance below its top the plate 30 is provided with a cam portion 32, which is adapted to bear against the lower end of a plate 33, located in the upper portion of the runner-shank below the pivotal point of the rocking valve 19. The lower end of the plate 30 is curved downward and backward in a shape substantially parallel with the surface of the sloping plate 18 and is provided at its lower end with a plunger 34.

35 indicates a plate which is secured between the side walls of the runner-shank with its lower end a short distance above the plate 18, and the plunger-head 34 is of such size that when slid along the sloping plate 18, as hereinafter described, it fills the space between the lower end of the plate 35 and the upper surface of the plate 18, thus forming a closure when the plunger is pushed downward and backward along the plate 18 to discharge the accumulated seed.

36 indicates a plate which is pivoted at its lower end immediately above the plate 35 and which extends across the runner-shank inside from side to side. The plate 36 is of such length that its upper end when secured in the position shown in Fig. 1 contacts the lower end of the plate 25 and when moved forward into the position shown in Fig. 3 its upper end contacts the plate 33. A pin 37 upon the plate 36 projects through a slot 38 in the side of the runner, where it is engaged by a suitable latch 39 (shown in dotted lines in Figs. 1 and 2) to lock it in either position.

It will be seen from the above description that the plates 25, 36, and 35 form the rear wall of the discharge-tube in the runner-shank when the devices are used for check-rowing—that is to say, when they are in the position shown in Figs. 1 and 2—and that the plates 33, 36, and 35 form the front wall of the discharge-tube when the mechanism is used for drilling—that is to say, when the devices are in the position shown in Fig. 3.

The operation of the device is as follows: When the mechanism is used for check-rowing, the plate 36 is locked back in the position shown in Figs. 1 and 2. The normal position of the parts is that shown in Fig. 1. The machine being in operation, a suitable number of grains of corn delivered by the seeding devices in the hopper in any well-known and approved manner is deposited through the seed-tube 12 upon the top of the plate 21 of the rocking valve 19, which thus forms the top closure of the devices. When the tappet on the tappet-wire 17 contacts the fork-lever 16 and drives it backward, the rocking valve 19 is thrown forward, its open portion coming below the discharge-spout, and the seed falls into the interior of the discharge-tube. As the rocking valve 19 or upper closure is rocked forward the plate 30 is moved downward, and the cam portion 32 bearing against the lower end of the arm 33 the plunger-head 34 is moved downward on the sloping plate 18 and kept in contact therewith by the cam action above described. As it passes downward under the lower end of the plate 35 it closes that opening, forming a second or middle closure and preventing any grains of corn from being dribbled out through the heel of the runner. At the extreme of the movement the plunger-head 34 is in the position shown in Fig. 2, nearly at the rear of the shelf 18. At the same time the plate 22 is drawn upward and moved backward away from the lower end of the shelf 18, opening the third or lowest closure. At the end of this operation the parts are in the position shown in Fig. 2. As soon as the tappet on the tappet-wire slips from the fork-lever the fork-lever is instantly returned to its first position by the usual springs and the parts resume the position shown in Fig. 1. Usually this will be done so quickly that the corn dropped through the tube 12 by the opening will hardly have had time to fall against the upper surface of the plunger before it is again withdrawn by this instantaneous returning of the fork mechanism and the lower end of the shelf 18 closed by the plate 22 being returned into the position shown in Fig. 1. Whether any corn has been caught in the second closure or not, however, this movement drops the accumulated corn upon the shelf ready to be deposited in the ground by the next operation of the plunger. Upon the contact of the next tappet upon the fork-lever the movements above described are repeated. The hill of corn laid upon the shelf 18 as above described is pushed or "kicked" out backward through the heel of the runner off the shelf 18 at a speed which will compensate for the forward motion of the machine and prevent the straggling of the corn as it drops, the charge accumulated by the seeding mechanism in the hopper being dropped to take the place of the charge just pushed out, as above described. When it is desired to use the planter as a drill, the swinging plate 36 is moved forward into the position shown in Fig. 3 and the fork of the check-rower moved back and tied or otherwise secured in the position shown in Fig. 3. This will bring all the parts into the position shown in said Fig. 3, the open portion of the rocking valve 19 being below the discharge-tube 12, and the seed will be dropped as the seeding devices in the hopper operate down through the channel formed between the plates 35, 36, and 25, which then form the front wall of the seed-channel, and the plate 22, which thus forms the rear wall of the seed-channel.

I have shown only one runner furrow-opener of the corn-planter. It will of course be understood that in ordinary practice there are two of these runners and seedboxes, one upon each side of the planter; but as they are duplicates of each other the description of one serves for a description of both. I have not shown the corn-planter itself, as my invention is confined to the parts shown, and the corn-planter being of any well-known and approved form and description will be readily understood in its structure and operation.

That which I claim as my invention, and desire to secure by Letters Patent, is—

1. In a corn-planter, the combination with a check-rower mechanism, a seedbox and a hollow runner-shank, of an opening between said seedbox and the top of said runner-shank, an upper valve controlling said opening and forming an upper closure, a shelf opening to the heel of said runner-shank, a plunger adapted to move along said shelf and discharge seed therefrom to the ground, an opening above said shelf adapted to be closed by said plunger to form an intermediate closure, a valve-plate adapted to close against said shelf to form a bottom closure, and connections between said check-rower devices and said upper valve and said valve-plate and said plunger whereby when said upper and lower closures are opened by the action of the check-rower mechanism the plunger will close said intermediate closure and force the seed from the shelf and when said upper and lower closures are closed said intermediate closure will be open.

2. In a corn-planter, the combination with a hollow runner-shank, a sloping shelf at the heel of the runner, and an opening for the passage of seed at the top of the shank, of a valve adapted when operated to alternately open and close said opening, check-rower mechanism connected with said valve, a plate pivotally connected at its upper end with said valve and having a plunger-head at its lower end adapted to move back and forth on said shelf when said check-rower mechanism is operated, an intermediate closure above said plate adapted to be closed by said plunger when moved to discharge the seed, and a valve-plate pivotally connected at its upper end with said valve and adapted to close against said shelf when said plunger is moved and to be lifted therefrom when said plunger moves along said shelf to discharge the seed, substantially as described.

3. In a corn-planter, the combination with a hollow runner-shank, a sloping shelf at the heel of the runner, and an opening for the passage of seed at the top of the shank, of a rocking valve adapted to swing past said opening and to alternately open and close the same when operated, check-rower mechanism connected with said rocking valve, a cam-plate pivotally connected at its upper end with said rocking valve and having a plunger-head at its lower end, a bearing in said shank adapted to bear upon said cam-plate and cause said plunger-head to slide back and forth along said shelf when the check-rower mechanism is operated, a series of plates extending across the opening in said runner from side to side to form a rear wall for the said tube and having the lower plate at a distance above said shelf adapted to be closed by said plunger, when moved to discharge the seed, to form an intermediate closure, a cam-plate pivotally connected at its upper end with said rocking valve, and a bearing on said runner-shank adapted to bear against said cam-plate and close the lower end of the same against said shelf to form a lower closure when said check-rowing devices are in their normal position, substantially as described.

4. In a corn-planter, the combination with a hollow runner-shank, a sloping shelf at the heel of the runner, an opening at the top of said runner-shank for the passage of seed, and check-rower mechanism, of a rocking valve pivoted in said runner-shank and adapted to swing past said opening to alternately open and close the same as said check-rower devices are operated, a plunger pivotally connected at its upper end to said rocking valve and adapted to slide back and forth on said plate as said check-rower mechanism is operated, a valve-plate pivotally connected at its upper end with said rocking valve and adapted to close against the end of said sloping shelf when said check-rower mechanism is in its normal position, a fixed plate 35 having a space between its lower end and said shelf adapted to be closed by said plunger when moved downward to discharge the seed, fixed plates 25 and 33 located in the upper part of said runner-shank with a space between them in the line of said discharge-opening, and a swinging plate 36 adapted to be rocked back against the lower end of the plate 25 or forward against the lower end of plate 33, substantially as described.

ERNST EMIL ENGLUND.

Witnesses:
J. C. TUNNICLIFF,
H. BERGENDAHL.